United States Patent
Akagi et al.

(10) Patent No.: US 8,910,080 B2
(45) Date of Patent: Dec. 9, 2014

(54) IMAGE DISPLAYING DEVICE

(75) Inventors: Koji Akagi, Aichi-ken (JP); Tetsuro Matsuno, Aichi-ken (JP); Tatsuya Sato, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 781 days.

(21) Appl. No.: 12/155,155

(22) Filed: May 30, 2008

(65) Prior Publication Data

US 2008/0301584 A1   Dec. 4, 2008

(30) Foreign Application Priority Data

May 31, 2007   (JP) ................................ P2007-145881

(51) Int. Cl.
| | | |
|---|---|---|
| G06F 3/00 | (2006.01) | |
| G06F 3/048 | (2013.01) | |
| H04N 1/00 | (2006.01) | |
| H04N 1/32 | (2006.01) | |

(52) U.S. Cl.
CPC ...... *H04N 1/0035* (2013.01); *H04N 2201/3274* (2013.01); *H04N 1/00448* (2013.01); *H04N 2201/0094* (2013.01); *H04N 1/32112* (2013.01); *H04N 1/00442* (2013.01); *H04N 1/00411* (2013.01); *H04N 2201/325* (2013.01); *H04N 2201/3247* (2013.01); *H04N 1/00458* (2013.01)
USPC ............ 715/810; 715/764; 715/838; 715/760

(58) Field of Classification Search
USPC .......................................... 715/838, 810, 767
See application file for complete search history.

(56) References Cited

U.S. PATENT DOCUMENTS

| | | | | |
|---|---|---|---|---|
| 7,312,785 | B2 * | 12/2007 | Tsuk et al. .................... | 345/156 |
| 7,479,949 | B2 * | 1/2009 | Jobs et al. ..................... | 345/173 |
| 7,689,933 | B1 * | 3/2010 | Parsons ......................... | 715/838 |
| 7,790,974 | B2 * | 9/2010 | Sherwani et al. .............. | 84/609 |
| 7,870,508 | B1 * | 1/2011 | Wright et al. ................. | 715/853 |
| 8,255,799 | B2 * | 8/2012 | Kintzley et al. ............... | 715/704 |
| 2001/0049704 | A1 * | 12/2001 | Hamburg et al. ............. | 707/530 |
| 2006/0004698 | A1 * | 1/2006 | Pyhalammi et al. ............. | 707/2 |
| 2006/0031199 | A1 * | 2/2006 | Newbold et al. .................. | 707/3 |
| 2006/0232604 | A1 | 10/2006 | Toyoda | |
| 2006/0242164 | A1 * | 10/2006 | Evans et al. ................... | 707/100 |

(Continued)

FOREIGN PATENT DOCUMENTS

| | | |
|---|---|---|
| JP | 9-325879 | 12/1997 |
| JP | 2005-109907 | 4/2005 |
| JP | 2006-195804 A | 7/2006 |
| JP | 2006-303634 A | 11/2006 |

OTHER PUBLICATIONS

Japan Patent Office, Office Action for Japanese Patent Application No. 2007-145881, mailed Sep. 6, 2011.

*Primary Examiner* — Amy Ng
*Assistant Examiner* — Erik Stitt
(74) *Attorney, Agent, or Firm* — Baker Botts L.L.P.

(57) ABSTRACT

An image-displaying device includes a storing unit and a displaying unit. The storing unit stores correlation data between a plurality of thumbnails and a sequence of the plurality of thumbnails. The displaying unit is capable of displaying a predetermined maximum number of thumbnails based on the correlation data. If a displayed thumbnail is selected by a user, the displaying unit displays identification data identifying the selected thumbnail together with the selected thumbnail. If identification data is selected by a user, the displaying unit displays a thumbnail corresponding to the selected identification data.

12 Claims, 13 Drawing Sheets

(56) References Cited

U.S. PATENT DOCUMENTS

| | | | |
|---|---|---|---|
| 2007/0088729 A1* | 4/2007 | Baca et al. | 707/101 |
| 2007/0101294 A1* | 5/2007 | Fong et al. | 715/838 |
| 2007/0240076 A1* | 10/2007 | Astala et al. | 715/800 |
| 2007/0300155 A1* | 12/2007 | Laefer et al. | 715/700 |
| 2008/0104535 A1* | 5/2008 | DeLine et al. | 715/785 |
| 2008/0201307 A1* | 8/2008 | Swartz | 707/3 |

* cited by examiner

| COORDINATE TABLE | |
|---|---|
| DISPLAY REGIONS S IN THUMBNAIL ROW | |
| S1 | (5, 10) ~ (17, 22) |
| ⋮ | ⋮ |
| S4 | (47, 10) ~ (59, 22) |
| SCROLLBAR DISPLAY REGION | (9, 5) ~ (54, 6) |
| SB1 | (9, 5) ~ (13, 6) |
| ⋮ | ⋮ |
| SELECTED NUMBER DISPLAY REGION N | (9, 1) ~ (54, 3) |
| N1 | (9, 1) ~ (13, 3) |
| ⋮ | ⋮ |

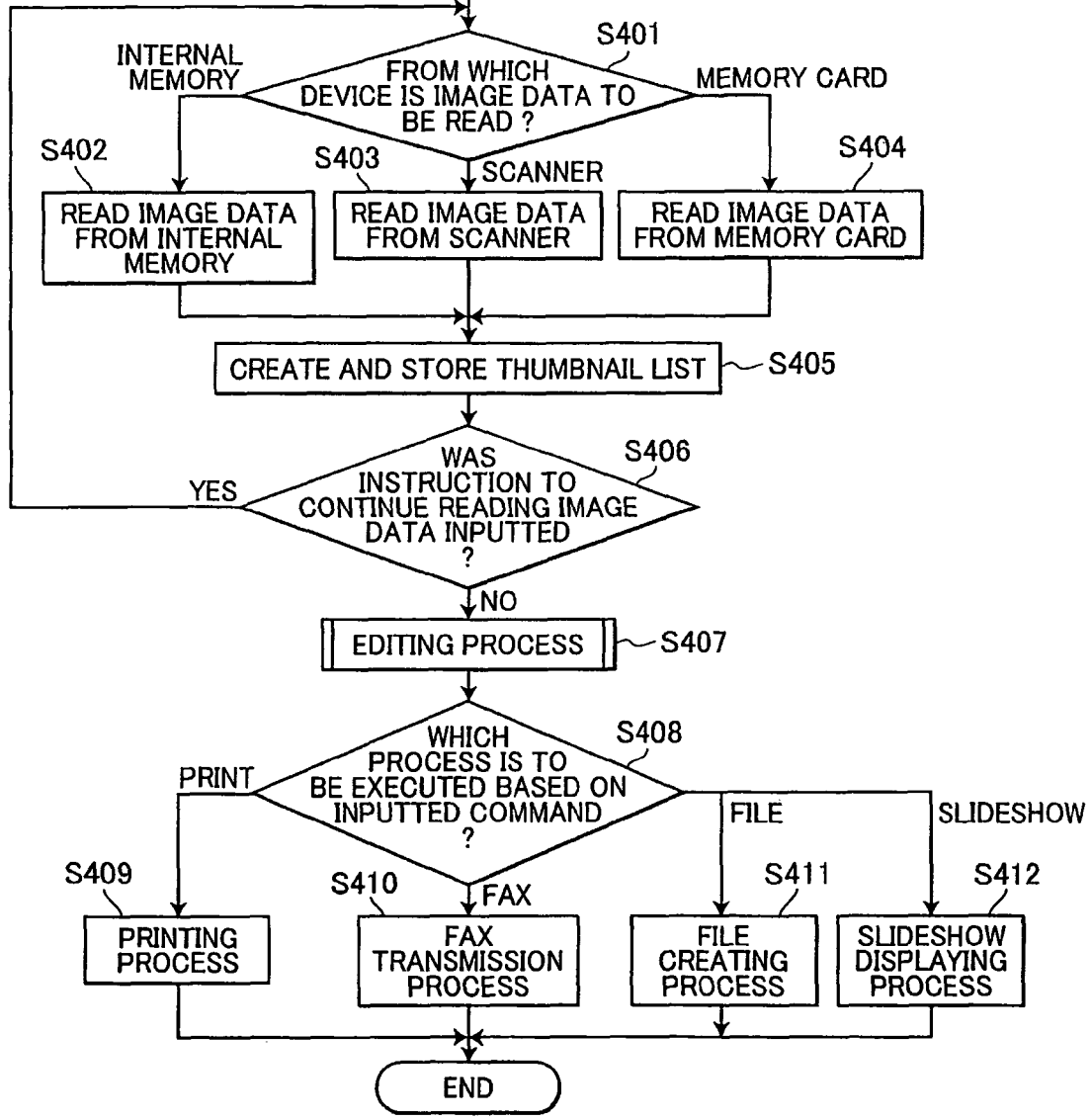

FIG.6(b1)

| PAGE NUMBER | FILENAME | IN-SCREEN FLAG | SELECTED FLAG | SELECTION NUMBER | SELECTION COUNT |
|---|---|---|---|---|---|
| 1 | aaa. pdf | 1 | 0 | - | - |
| 2 | b2b2. pdf | 1 | 0 | - | - |
| 3 | 333c. pdf | 1 | 0 | - | - |
| 4 | 4ddd. pdf | 1 | 0 | - | - |
| 5 | Ⅴ. pdf | 0 | 0 | - | - |
| 6 | 六. pdf | 0 | 0 | - | - |
| 7 | しち. pdf | 0 | 0 | - | - |
| 8 | 八. pdf | 0 | 0 | - | - |
| ⋮ | ⋮ | ⋮ | ⋮ | ⋮ | ⋮ |
| 11 | eleven. pdf | 0 | 0 | - | - |
| 12 | 12. pdf | 0 | 0 | - | - |
| ⋮ | ⋮ | ⋮ | ⋮ | ⋮ | ⋮ |

THUMBNAIL ROW LIST

FIG.6(b2)

| PAGE NUMBER | FILENAME | IN-SCREEN FLAG | SELECTED FLAG | SELECTION NUMBER | SELECTION COUNT |
|---|---|---|---|---|---|
| 1 | aaa. pdf | 0 | 0 | - | - |
| 2 | b2b2. pdf | 0 | 0 | - | - |
| 3 | 333c. pdf | 0 | 0 | - | - |
| 4 | 4ddd. pdf | 0 | 0 | - | - |
| 5 | Ⅴ. pdf | 1 | 0 | - | - |
| 6 | 六. pdf | 1 | 0 | - | - |
| 7 | しち. pdf | 1 | 0 | - | - |
| 8 | 八. pdf | 1 | 0 | - | - |
| ⋮ | ⋮ | ⋮ | ⋮ | ⋮ | ⋮ |
| 11 | eleven. pdf | 0 | 0 | - | - |
| 12 | 12. pdf | 0 | 0 | - | - |
| ⋮ | ⋮ | ⋮ | ⋮ | ⋮ | ⋮ |

THUMBNAIL ROW LIST

FIG.7(b1)

| THUMBNAIL ROW LIST 55 | 56 | 57 | 58 | 59 | 60 |
|---|---|---|---|---|---|
| PAGE NUMBER | FILENAME | IN-SCREEN FLAG | SELECTED FLAG | SELECTION NUMBER | SELECTION COUNT |
| 1 | aaa.pdf | 1 | 0 | – | – |
| 2 | b2b2.pdf | 1 | 1 | 1 | 1 |
| 3 | 333c.pdf | 1 | 0 | – | – |
| 4 | 4ddd.pdf | 1 | 0 | – | – |
| 5 | V.pdf | 0 | 0 | – | – |
| 6 | 六.pdf | 0 | 0 | – | – |
| 7 | しち.pdf | 0 | 0 | – | – |
| 8 | 八.pdf | 0 | 0 | – | – |
| ⋮ | ⋮ | ⋮ | ⋮ | ⋮ | ⋮ |
| 11 | eleven.pdf | 0 | 0 | – | – |
| 12 | 12.pdf | 0 | 0 | – | – |
| ⋮ | ⋮ | ⋮ | ⋮ | ⋮ | ⋮ |

FIG.7(b2)

| THUMBNAIL ROW LIST 55 | 56 | 57 | 58 | 59 | 60 |
|---|---|---|---|---|---|
| PAGE NUMBER | FILENAME | IN-SCREEN FLAG | SELECTED FLAG | SELECTION NUMBER | SELECTION COUNT |
| 1 | aaa.pdf | 0 | 0 | – | – |
| 2 | b2b2.pdf | 0 | 1 | 1 | 1 |
| 3 | 333c.pdf | 0 | 0 | – | – |
| 4 | 4ddd.pdf | 0 | 0 | – | – |
| 5 | V.pdf | 1 | 0 | – | – |
| 6 | 六.pdf | 1 | 0 | – | – |
| 7 | しち.pdf | 1 | 0 | – | – |
| 8 | 八.pdf | 1 | 1 | 2 | 1 |
| ⋮ | ⋮ | ⋮ | ⋮ | ⋮ | ⋮ |
| 11 | eleven.pdf | 0 | 0 | – | – |
| 12 | 12.pdf | 0 | 0 | – | – |
| ⋮ | ⋮ | ⋮ | ⋮ | ⋮ | ⋮ |

FIG.8(b1)

| THUMBNAIL ROW LIST | | | | | |
|---|---|---|---|---|---|
| PAGE NUMBER | FILENAME | IN-SCREEN FLAG | SELECTED FLAG | SELECTION NUMBER | SELECTION COUNT |
| 1 | aaa. pdf | 1 | 0 | – | – |
| 2 | b2b2. pdf | 1 | 1 | 1 | 1 |
| 3 | 333c. pdf | 1 | 0 | – | – |
| 4 | 4ddd. pdf | 1 | 1 | 3 | 1 |
| 5 | Ⅴ. pdf | 0 | 0 | – | – |
| 6 | 六. pdf | 0 | 0 | – | – |
| 7 | しち. pdf | 0 | 0 | – | – |
| 8 | 八. pdf | 0 | 1 | 2 | 1 |
| ⋮ | ⋮ | ⋮ | ⋮ | ⋮ | ⋮ |
| 11 | eleven. pdf | 0 | 0 | – | – |
| 12 | 12. pdf | 0 | 0 | – | – |
| ⋮ | ⋮ | ⋮ | ⋮ | ⋮ | ⋮ |

FIG.8(b2)

| THUMBNAIL ROW LIST | | | | | |
|---|---|---|---|---|---|
| PAGE NUMBER | FILENAME | IN-SCREEN FLAG | SELECTED FLAG | SELECTION NUMBER | SELECTION COUNT |
| 1 | aaa. pdf | 0 | 0 | – | – |
| 2 | b2b2. pdf | 0 | 1 | 1 | 1 |
| 3 | 333c. pdf | 0 | 0 | – | – |
| 4 | 4ddd. pdf | 0 | 1 | 3 | 2 |
| 5 | Ⅴ. pdf | 1 | 0 | – | – |
| 6 | 六. pdf | 1 | 0 | – | – |
| 7 | しち. pdf | 1 | 0 | – | – |
| 8 | 八. pdf | 1 | 1 | 2 | 1 |
| ⋮ | ⋮ | ⋮ | ⋮ | ⋮ | ⋮ |
| 11 | eleven. pdf | 0 | 0 | – | – |
| 12 | 12. pdf | 0 | 0 | – | – |
| ⋮ | ⋮ | ⋮ | ⋮ | ⋮ | ⋮ |

FIG.9(b1)

| THUMBNAIL ROW LIST 55 | 56 | 57 | 58 | 59 | 60 |
|---|---|---|---|---|---|
| PAGE NUMBER | FILENAME | IN-SCREEN FLAG | SELECTED FLAG | SELECTION NUMBER | SELECTION COUNT |
| 1 | aaa.pdf | 0 | 0 | – | – |
| 2 | b2b2.pdf | 0 | 1 | 1 | 1 |
| 3 | 333c.pdf | 0 | 0 | – | – |
| 4 | 4ddd.pdf | 0 | 1 | 3 | 1 |
| 5 | Ⅴ.pdf | 1 | 0 | – | – |
| 6 | 六.pdf | 1 | 0 | – | – |
| 7 | しち.pdf | 1 | 0 | – | – |
| 8 | 八.pdf | 1 | 1 | 2 | 1 |
| ⋮ | ⋮ | ⋮ | ⋮ | ⋮ | ⋮ |
| 11 | eleven.pdf | 0 | 0 | – | – |
| 12 | 12.pdf | 0 | 0 | – | – |
| ⋮ | ⋮ | ⋮ | ⋮ | ⋮ | ⋮ |

FIG.9(b2)

| THUMBNAIL ROW LIST 55 | 56 | 57 | 58 | 59 | 60 |
|---|---|---|---|---|---|
| PAGE NUMBER | FILENAME | IN-SCREEN FLAG | SELECTED FLAG | SELECTION NUMBER | SELECTION COUNT |
| 1 | aaa.pdf | 0 | 0 | – | – |
| 2 | b2b2.pdf | 0 | 1 | 1 | 1 |
| 3 | 333c.pdf | 0 | 0 | – | – |
| 4 | 4ddd.pdf | 0 | 1 | 2 | 1 |
| 5 | Ⅴ.pdf | 1 | 0 | – | – |
| 6 | 六.pdf | 1 | 0 | – | – |
| 7 | しち.pdf | 1 | 0 | – | – |
| 8 | 八.pdf | 1 | 0 | – | – |
| ⋮ | ⋮ | ⋮ | ⋮ | ⋮ | ⋮ |
| 11 | eleven.pdf | 0 | 0 | – | – |
| 12 | 12.pdf | 0 | 0 | – | – |
| ⋮ | ⋮ | ⋮ | ⋮ | ⋮ | ⋮ |

IMAGE DISPLAYING DEVICE

CROSS REFERENCE TO RELATED APPLICATION

This application claims priority from Japanese Patent Application No. 2007-145881 filed May 31, 2007. The entire content of each of these priority applications is incorporated herein by reference.

TECHNICAL FIELD

The present invention relates to an image-displaying device enabling the user to display desired thumbnail images from among user-selected thumbnail images through simple operations.

BACKGROUND

An image-displaying device including displaying means for displaying thumbnail images created from data for a plurality of images is well known in the art. One such image-displaying device disclosed in Japanese unexamined patent application publication No. 2005-109907 allows the user to select thumbnail images from among thumbnail images arranged in a prescribed order on a display unit 32, and displays these images so as to be easily distinguishable from non-selected images. When the user presses a Finished button BT10 to indicate that the user has finished selecting thumbnail images, the user-selected thumbnail images are sorted out of the non-selected thumbnail images and displayed separately therefrom.

SUMMARY

However, with the technology disclosed in Japanese unexamined patent application publication No. 2009-109907 described above, if the user selects a large number of thumbnail images, some of the thumbnail images cannot be displayed within the display screen for the user to view.

While the image-displaying device may be configured to enable the user to scroll the display screen in this case in order to view thumbnail images not displayed in the initial display screen, the user must perform two operations for (1) inputting instructions to reorder the thumbnail images and (2) inputting instructions to scroll the display screen. Hence, the user must perform numerous operations after selecting thumbnail images before the desired thumbnail images are displayed.

In view of the above-described drawbacks, it is an objective of the present invention to provide an image-displaying device enabling a user to display desired thumbnail images from among user-selected images through simple operations.

In order to attain the above and other objects, the present invention provides an image-displaying device including a storing unit and a displaying unit. The storing unit stores correlation data between a plurality of thumbnails and a sequence of the plurality of thumbnails. The displaying unit is capable of displaying a predetermined maximum number of thumbnails based on the correlation data. If a displayed thumbnail is selected by a user, the displaying unit displays identification data identifying the selected thumbnail together with the selected thumbnail. If identification data is selected by a user, the displaying unit displays a thumbnail corresponding to the selected identification data.

BRIEF DESCRIPTION OF THE DRAWINGS

The particular features and advantages of the invention as well as other objects will become apparent from the following description taken in connection with the accompanying drawings, in which:

FIG. 4 is a flowchart illustrating steps in an image data reordering process;

DETAILED DESCRIPTION

Figure 1:
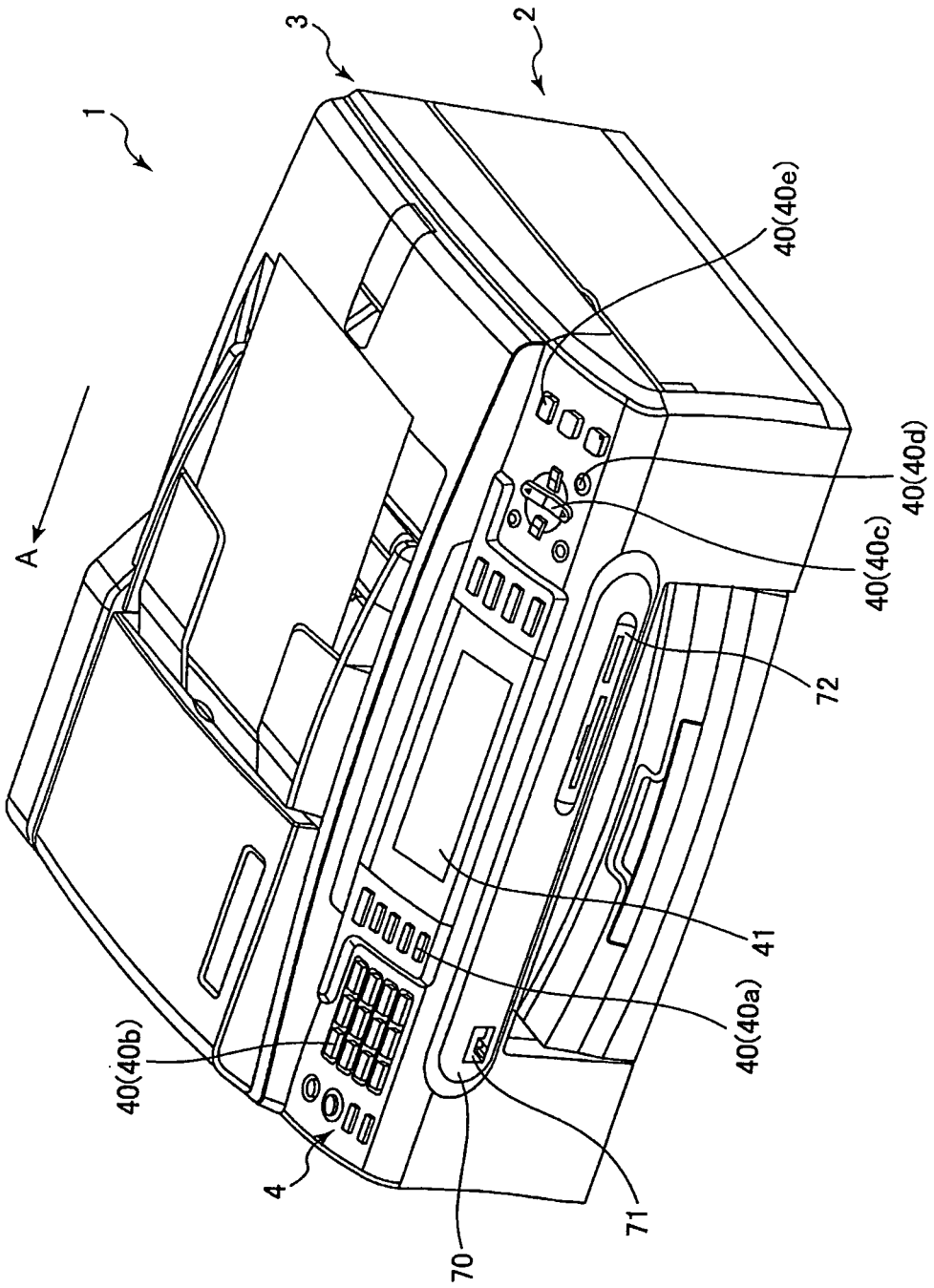
FIG. 1 is a perspective view showing the outer structure of a multifunction device.

Next, preferred embodiments of the present invention will be described while referring to the accompanying drawings. FIG. 1 is a perspective view showing the outer structure of a multifunction device 1 according to the preferred embodiments. A feature of the present invention is that the multifunction device 1 can maintain the display state of one thumbnail row among a presorted thumbnail row and a sorted thumbnail row, while allowing the user to shift thumbnail images (hereinafter also referred to simply as "thumbnails") displayed in the other thumbnail row.

As shown in FIG. 1, the multifunction device 1 is integrally configured of a printer 2 occupying the lower section, a scanner 3 occupying the upper section, and a control panel 4 provided on the front surface of the scanner 3. The multifunction device 1 has a scanner function, copier function, and facsimile function.

In addition to the above functions, the multifunction device 1 has a function for connecting to external devices, such as a USB memory device, a digital camera, and a personal computer and for recording data received from these external devices on a recording paper K; and a function for displaying data received from the external devices on a liquid crystal display (LCD) 41 provided on the control panel 4.

The control panel 4 is disposed on the front surface side of the multifunction device 1 and is used for operating the printer 2 and scanner 3. The control panel 4 includes various operating keys 40 (40a, 40b, 40c, 40d, and 40e), and the LCD 41.

The LCD 41 is rectangular in shape and elongated in the direction indicated by an arrow A in FIG. 1 (width direction of the multifunction device 1) and has a vertical-to-horizontal ratio of 3:8, where the width direction is the horizontal. More specifically, the LCD 41 is integrally configured of two independent rectangular LCDs having a vertical-to-horizontal ratio of 3:4 and juxtaposed in the direction A, although the LCD 41 is not shown to scale in FIG. 1.

The LCD 41 is also integrally configured of a direct touch panel well known in the art. By directly touching thumbnails, icons, and the like displayed on the LCD 41, the user can select such images and icons located at the touched coordinates of the LCD 41. In addition to directly touching a specific region of the display, the user can trace a desired path on the LCD 41, at which time the touch panel also recognizes the final coordinates in the path traced on the LCD 41.

When the user inputs a desired command into the multifunction device 1, a controller 20 (see FIG. 2) controls operations of the multifunction device 1 based on the inputted data. In addition to commands inputted via the control panel 4, the multifunction device 1 can be operated based on commands transmitted from a computer via a printer driver, scanner driver, and the like.

A connection panel 70 is provided below the control panel 4. A USB terminal 71 is provided in the left side of the connection panel 70. The USB terminal 71 allows the multifunction device 1 to be connected with a USB cable to an external device so that the external device and the multifunction device 1 can communicate with each other.

A slot section 72 is disposed in the right side of the connection panel 70. The slot section 72 is provided with a plurality of card slots in which memory cards (card-like memory) may be inserted. When a memory card is inserted into a card slot, the controller 20 described later can read image data from the memory card.

Figure 2:
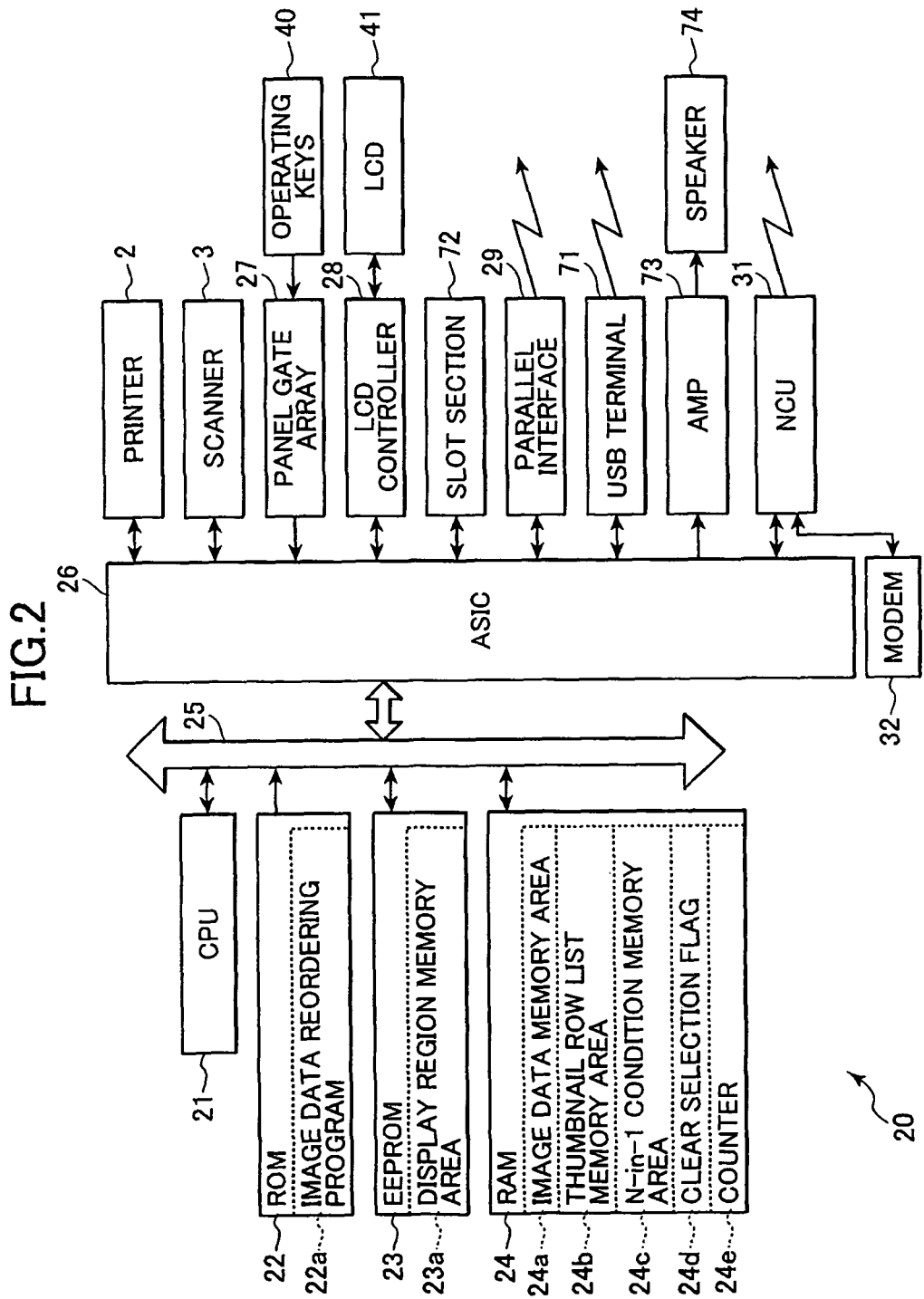
FIG. 2 is a block diagram showing the general structure of a controller in the multifunction device.

Next, the overall structure of the controller 20 that controls operations of the multifunction device 1 will be described with reference to FIG. 2. FIG. 2 is a block diagram showing the overall structure of the controller 20. The controller 20 controls overall operations of the multifunction device 1, including the printer 2, scanner 3, and control panel 4.

The controller 20 is configured of a microcomputer primarily including a central processing unit (CPU) 21, a read-only memory (ROM) 22, an electrically erasable programmable ROM (EEPROM) 23, and a random access memory (RAM) 24, all of which are connected to an application specific integrated circuit (ASIC) 26 via a bus 25.

The CPU 21 performs overall control of the multifunction device 1 based on programs stored in the ROM 22. The ROM 22 stores programs for controlling various operations of the multifunction device 1, including an image data reordering program 22a for implementing an image data reordering process shown in the flowchart of FIG. 4. The image data reordering process functions to resort a prescribed order of a predetermined plurality of images (according to the modified data, filenames, size, or the like) according to the user's instruction, and to print, transmit via fax, save, or display the plurality of images according to the modified order.

The EEPROM 23 is a rewritable nonvolatile memory and includes a display region memory area 23a. The display region memory area 23a stores display regions S1-S5 of thumbnails, display regions of icons, and the like displayed on the LCD 41 in association with their coordinates relative to the LCD 41.

The display region memory area 23a will be described here in greater detail with reference to FIG. 3. FIG. 3(a) illustrates the display positions of thumbnails and icons on the LCD 41 when displaying the thumbnail image display according to the first embodiment on the LCD 41. FIG. 3(b) conceptually illustrates a coordinate table according to the first embodiment stored in the display region memory area 23a.

Figures 3A, 3B:
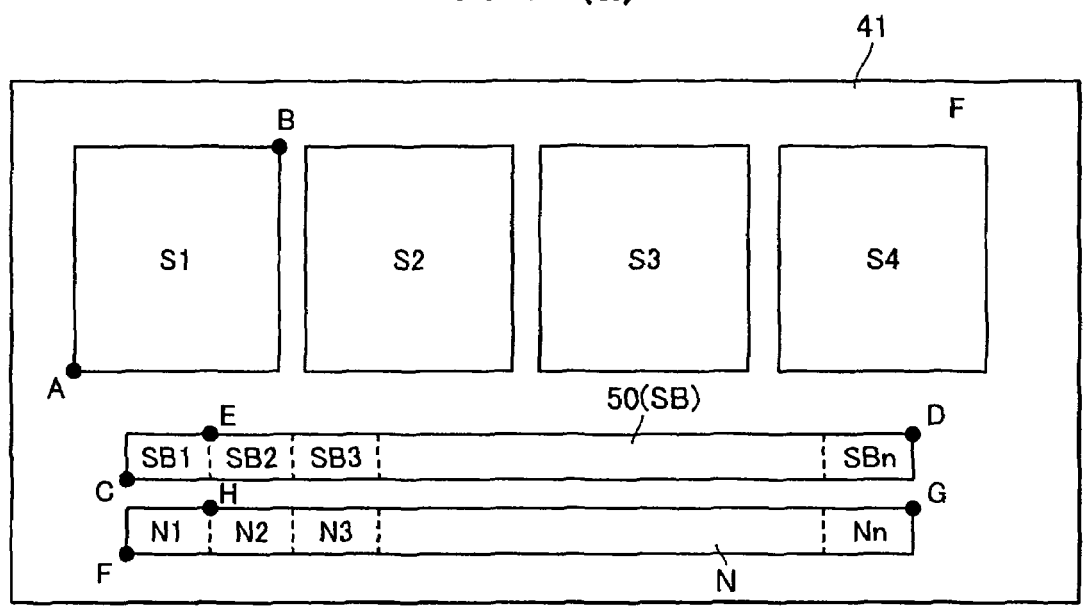
FIG. 3 is an explanatory diagram showing (a) display positions of thumbnails and icons within a thumbnail display screen displayed on an LCD, and (b) a coordinate table stored in a display region memory area.

FIG. 3(a) shows a thumbnail display screen displayed on the LCD 41. The thumbnail display screen includes a maximum of four pages worth of thumbnails juxtaposed horizontally in a prescribed order. In an initial state, thumbnails for image data stored in an image data memory area 24a described later are displayed in a prescribed order (according to the modified date, filenames, size, or the like). Display regions S1-S4 in which the four pages of thumbnails are displayed are stored in a coordinate table in association with coordinates on the LCD 41.

For example, as indicated in FIGS. 3(a) and (b), the leftmost display region S1 of the thumbnail row is stored in association with two points A and B on the LCD 41 having coordinates (5, 10) and (17, 22), respectively. The coordinates for these two points define a rectangular region corresponding to the display region S1. Similarly, each of the display regions S2-S4 in the thumbnail row is stored in association with coordinates for two points on the LCD 41, enabling a touch panel or the like configuring the LCD 41 to detect when one of the display regions S1-S4 has been touched.

A scroll bar display region SB is also set in the display screen below the thumbnail row for displaying a scrollbar 50 configured of a band-like icon. The scrollbar 50 accepts user instructions to scroll the thumbnails displayed in the thumbnail row.

The scroll bar display region SB is divided uniformly in the longitudinal direction by the total number of images in the image data. Each divided segment of the scroll bar display region SB is stored in the coordinate table in association with corresponding coordinates on the LCD 41. That is, the total length of the scrollbar 50 in the longitudinal direction corresponds to the total number of images, with positions on the scrollbar 50 indicating pages of data in order from the left side. For example, if the total number of images is 30, the left longitudinal edge of the scrollbar 50 indicates the first page, the middle position indicates the fifteenth page, and the right edge indicates the thirtieth page.

More specifically, as shown in FIG. 3(b), the scroll bar display region SB is stored in the coordinate table in association with two points C and D on the LCD 41 having coordinates (9, 5) and (54, 6), respectively. The coordinates for these two points define a rectangular region corresponding to the scroll bar display region SB.

Further, each segment of the scroll bar display region SB produced by dividing the scroll bar display region SB uniformly in the longitudinal direction by the total number of images is stored in the coordinate table in association with coordinates for two points on the LCD 41. For example, a segment SB1 for the first page is stored in association with two points C and E on the LCD 41 having coordinates (9, 5) and (13, 6), respectively. The coordinates for these two points define a rectangular region corresponding to the segment SB1. Accordingly, a touch panel configuring the LCD 41 can detect not only when one of the segments in the scroll bar display region SB has been touched, but also which page worth of image data to which the touched segment corresponds.

Figure 7:
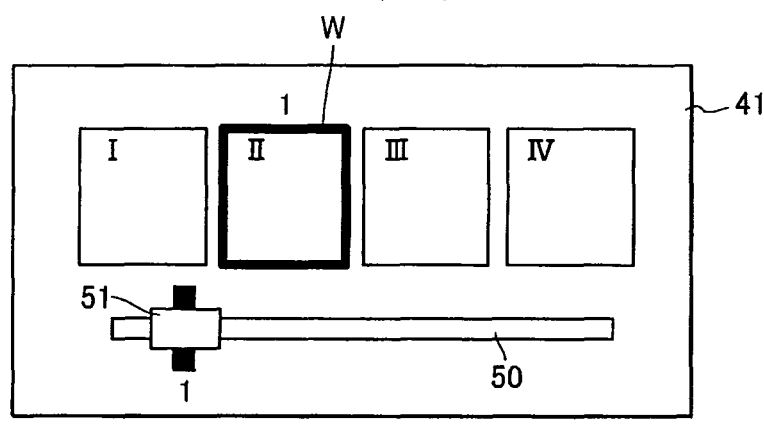
FIG. 7 is an explanatory diagram showing (a1) the thumbnail display screen, (b1) the thumbnail list for displaying the thumbnail display screen of (a1), (a2) the thumbnail display screen, and (b2) the thumbnail list for displaying the thumbnail display screen of (a2)
Figure 7:
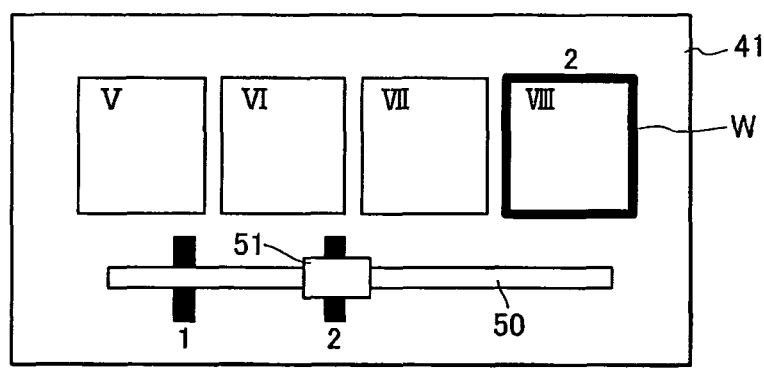
Figure 8:
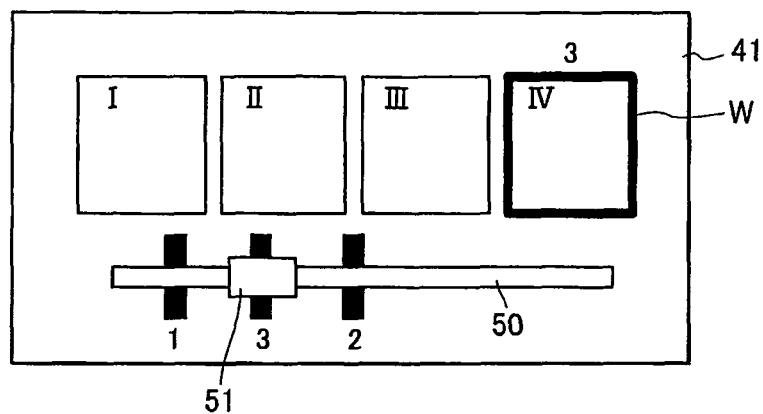
FIG. 8 is an explanatory diagram showing (a1) the thumbnail display screen, (b1) the thumbnail list for displaying the thumbnail display screen of (a1), (a2) the thumbnail display screen, and (b2) the thumbnail list for displaying the thumbnail display screen of (a2)
Figure 8:
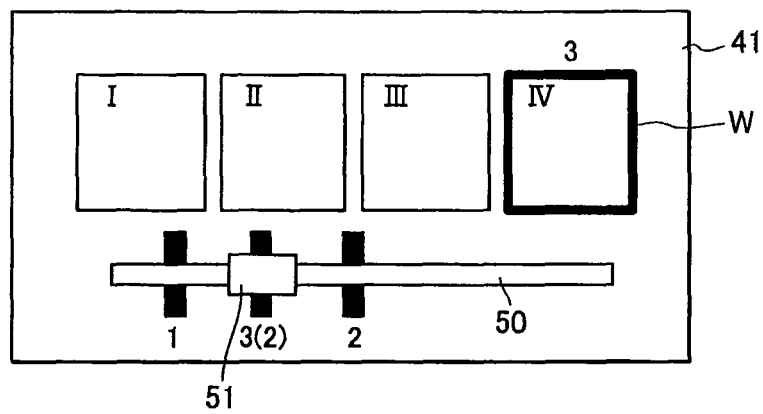
Figure 9:
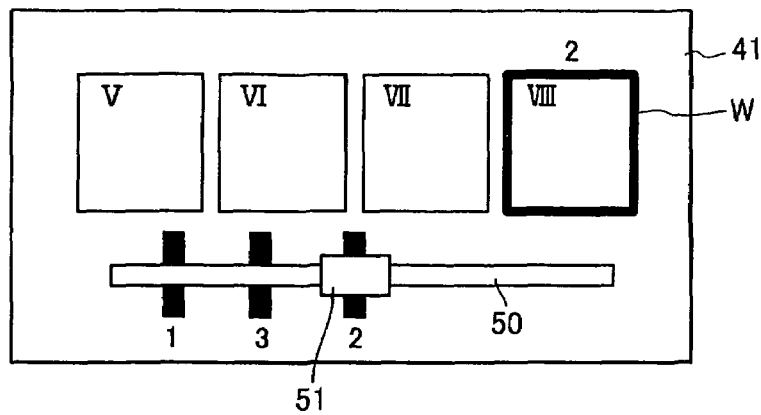
FIG. 9 is an explanatory diagram showing (a1) the thumbnail display screen, (b1) the thumbnail list for displaying the thumbnail display screen of (a1), (a2) the thumbnail display screen, and (b2) the thumbnail list for displaying the thumbnail display screen of (a2).
Figure 9:
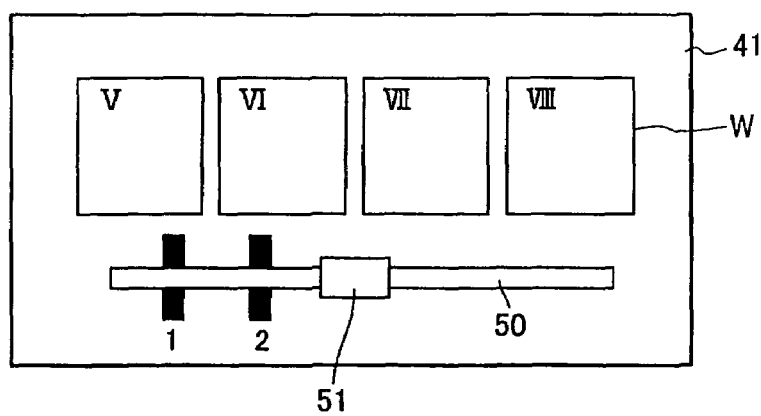

A selection number display region N is provided below the scrollbar 50 in the display screen. Selection numbers are displayed in the selection number display region N in the form of numerals, as shown in FIGS. 7, 8 and 9), indicating the selection order for thumbnails selected by the user from the thumbnail row. The selection number display region N is divided into display regions (segments) corresponding to the number of segments in the scrollbar 50. Specifically, as shown in FIG. 3(b), the entire display region of the selection number display region N is stored in the coordinate table in association with two points F and G on the LCD 41 having coordinates (9, 1) and (54, 3), respectively. The coordinates for these two points define a rectangular region corresponding to the total display region of the selection number display region N.

The selection number display region N is divided in the longitudinal direction into a number of segments corresponding to the number of segments of the scrollbar 50, as mentioned above, and each segment of the selection number display region N is also stored in the coordinate table in association with coordinates for two points on the LCD 41. For example, a segment N1 corresponding to the segment SB1 for the first page of the scrollbar 50 is stored in the coordinates table in association with two points F and H of the LCD 41 having coordinates (9, 1) and (13, 3), respectively. The coordinates for these two points define a rectangular region corresponding to the segment N1. In this way, a touch panel configuring the LCD 41 can detect not only when one of the segments of the selection number display region N has been touched, but also which page of image data to which the touched segment corresponds.

The RAM 24 of the controller 20 shown in FIG. 2 is used as a storage area for temporarily storing various data used when the CPU 21 executes the above programs and as a work area for the CPU 21. The RAM 24 includes an image data memory area 24a, a thumbnail list memory area 24b, an N-in-1 condition memory area 24c, a clear selection flag 24d, and a counter 24e.

The image data memory area 24a stores image data of thumbnail images displayed in the thumbnail image display. The image data stored in the image data memory area 24a is read from a memory card, internal memory such as the EEPROM 23, or the scanner 3.

Figure 6:
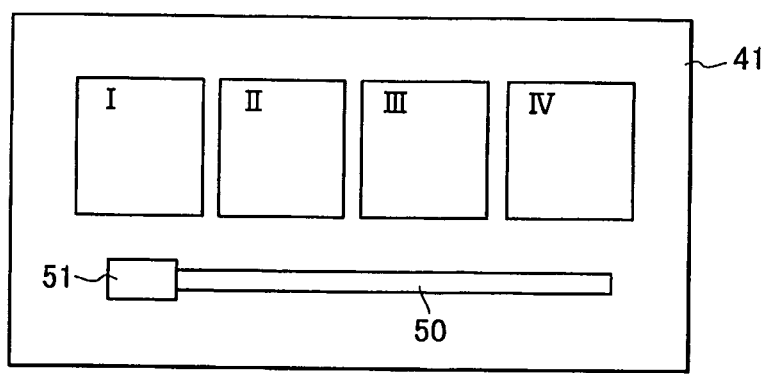
FIG. 6 is an explanatory diagram showing (a1) a thumbnail display screen, (b1) a thumbnail list for displaying the thumbnail display screen of (a1), (a2) the thumbnail display screen, and (b2) the thumbnail list for displaying the thumbnail display screen of (a2)
Figure 6:
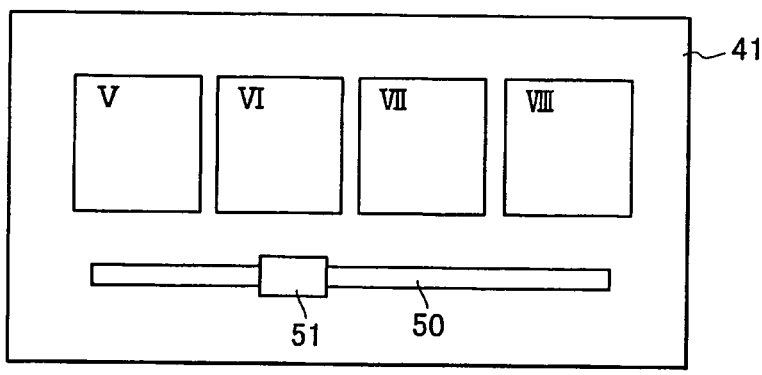

The thumbnail list memory area 24b stores a list of the thumbnails (FIG. 6(b1)). Thumbnails are displayed in the thumbnail row according to this list of thumbnails. The list of thumbnails is described later.

The N-in-1 condition memory area 24c stores a condition indicating what arrangement to print N pages worth of images on a single sheet of paper. The user sets the N-in-1 condition stored in the N-in-1 condition memory area 24c.

The clear selection flag 24d is set by the user, and indicates whether to clear the selection of the thumbnail that the user has selected from the thumbnails displayed in the thumbnail row, that is, whether to deselect the thumbnail that the user has selected from the thumbnails displayed in the thumbnail row. If the user selects a prescribed thumbnail when the clear selection flag 24d is set to "1" and the selected thumbnail is in a selected state, the selected state of the thumbnail is cleared, i.e., the thumbnail is deselected.

The counter 24e serves to sequentially count thumbnails set to the selected state by the user from among the thumbnails displayed in the thumbnail row. When the user selects a single thumbnail, the counter 24e is incremented by 1. If the user deselects a thumbnail in the selected state, the counter 24e is decremented by 1.

The ASIC 26 controls operations of the printer 2, scanner 3, control panel 4, slot section 72, and the like based on instructions from the CPU 21.

The ASIC 26 is connected to a panel gate array 27 for receiving commands inputted from the operating keys 40, an LCD controller 28 for controlling the display on the LCD 41, a parallel interface 29 for exchanging data with a computer via a parallel cable or a USB cable, the USB terminal 71, and a speaker 74 via a amp 73. The ASIC 26 is also connected to a network control unit (NCU) 31, and a modem 32 is connected to the NCU 31.

Next, the image data reordering process will be described with reference to FIG. 4. FIG. 4 is a flowchart illustrating steps in the image data reordering process. This process serves to modify the order of a predetermined plurality of images and to print, transmit via fax, save, or display the plurality of images according to the modified order. The process is executed when the user inputs an execute instruction.

The user inputs an execute instruction by pressing a menu key 40a to display a menu on the LCD 41 and by selecting the image data reordering process from the menu using a selection key 40d, for example. At this time, the multifunction device 1 recognizes that the user has inputted an execute instruction and begins the main process. The multifunction device 1 may also execute the process upon receiving an instruction to display the menu from an external device connected to the multifunction device 1 via an interface. In the latter case, instructions in the following process are also received from the external device.

In S401 of the image data reordering process shown in FIG. 4, the CPU 21 determines whether an instruction indicating from which device image data is to be read has been inputted. Specifically, the CPU 21 displays on the LCD 41a list of devices including internal memory, memory cards, a scanner, and external storage devices and external computers connected via interfaces, as well as a message requesting the user to select a desired device from the device list. When the user touches a desired device in the device list, the CPU 21 determines that the user has inputted an instruction to read image data from the device in the list that was touched. Devices from which image data can be read are not limited to the examples given here.

If the user inputted an instruction to read image data from internal memory (the EEPROM 23, for example), in S402 the CPU 21 reads image data from the internal memory and stores this data in the image data memory area 24a. If the user inputted an instruction to read image data from the scanner 3, in S403 the CPU 21 starts the scanner 3, reads image data scanned by the scanner 3, and stores the data in the image data memory area 24a. If the user inputted an instruction to read image data from a memory card, in S404 the CPU 21 reads image data from the memory card and stores this data in the image data memory area 24a.

In S405 the CPU 21 creates a list of thumbnails (FIG. 6(b1)) from the image data stored in the image data memory area 24a and stores this thumbnail list in the thumbnail list memory area 24b. At the same time, the CPU 21 assigns coordinates on the LCD 41 to each segment of the scrollbar 50 based on the total number of images in the image data and stores data correlating the coordinates and segments of the scrollbar 50 in the display region memory area 23a. The CPU 21 also assigns coordinates on the LCD 41 to each segment of the selection number display N based on the total number of images in the image data and stores data correlating the coordinates and segments of the scrollbar 50 in the display region memory area 23a.

After the CPU 21 creates and stores the thumbnail list in S405, in S406 the CPU 21 displays a message on the LCD 41 prompting the user to indicate whether to continue reading image data and determines whether the user has inputted an instruction to continue reading. If the user has inputted an instruction to continue (S406: YES), the CPU 21 repeats the process from S401 and adds required data for the newly read image data to the thumbnail list. The CPU 21 also assigns coordinates on the LCD 41 to each segment of the scrollbar 50 based on the total number of images in the image data and stores data correlating the coordinates and segments of the scrollbar 50 in the display region memory area 23a. However, if the user inputted an instruction not to continue (S406: NO), then the CPU 21 executes the editing process in S407.

Figure 5:
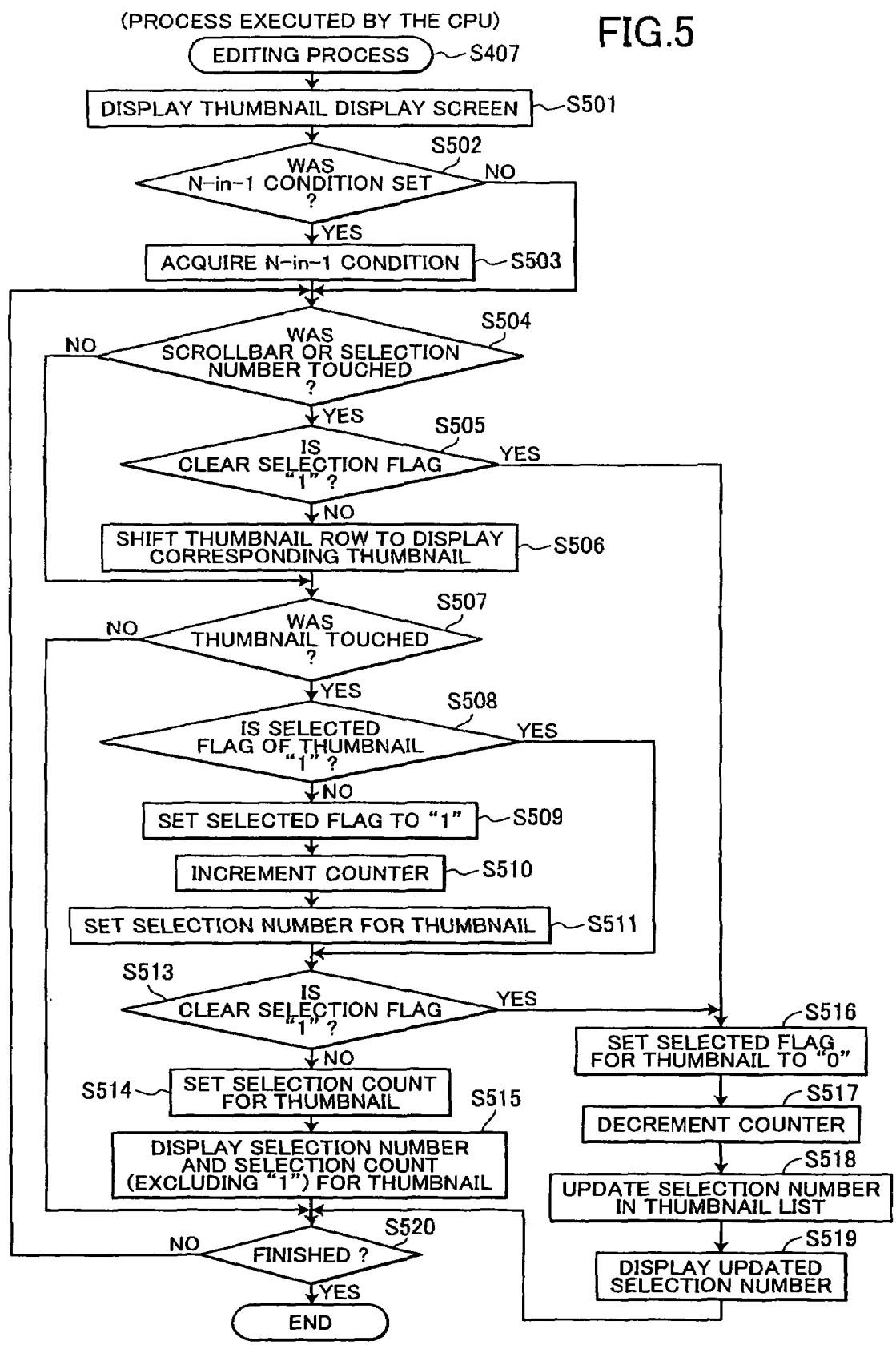
FIG. 5 is a flowchart illustrating steps in an editing process.

FIG. 5 is a flowchart illustrating steps in the editing process. In S501 at the beginning of this process, the CPU 21 displays the thumbnail display screen in its initial state (see FIG. 6(a1)) on the LCD 41 based on the thumbnail list stored in the thumbnail list memory area 24b. As described above, when a command to display the menu is received from an external device or the like, various displays of menus and the like may be displayed by transmitting data for those displays to a display device provided in the external device.

Here, the initial state of the thumbnail display screen will be described with reference to FIGS. 6(a1) and 6(b1). FIG. 6(a1) shows the thumbnail display screen in its initial state, while FIG. 6(b1) conceptually illustrates the thumbnail list in its initial state.

The initial state of the thumbnail display screen shown in FIG. 6(a1) is displayed based on the initial state of the thumbnail list shown in FIG. 6(b1). As shown in FIG. 6(b1), the thumbnail list associates a page number 55, an image filename 56, an in-screen flag 57, a selected flag 58, a selection number 59, and a selection count 60 with each thumbnail (each image data).

The page number 55 indicates the order in which each thumbnail is displayed in the thumbnail row. The image filename 56 indicates the filename of the image data corresponding to each thumbnail. The image filename 56 can be used to identify the image data corresponding to the thumbnail. The in-screen flag 57 indicates whether the thumbnail image is displayed on the LCD 41 and is set to "1" when displayed and "0" when not displayed. The selected flag 58 indicates whether the thumbnail has been selected and is set to "1" if selected and "0" if not selected (or unselected). The selection number 59 indicates the selected order of the thumbnail. The selection count 60 indicates the number of selections made.

In the preferred embodiment, the in-screen flag 57 is initially set to "1" for thumbnails having a page number 55 of "1-4". The thumbnails having an in-screen flag 57 set to "1" are displayed from left to right in the thumbnail row in increasing order of the page numbers 55.

Hence, if the thumbnail list is that shown in FIG. 6(b1), thumbnails corresponding to the image filenames "aaa.pdf," "b2b2.pdf," "333c.pdf," and "4ddd.pdf" in order from left to right in the thumbnail row of the thumbnail display screen shown in FIG. 6(a1).

Further, a roman numeral (I, II, III, . . . ) corresponding to the page number 55 of each thumbnail is displayed in association with each thumbnail displayed in the thumbnail row. In addition to the thumbnails, the scrollbar 50 is displayed in the display screen based on the coordinates of the LCD 41 stored in the coordinate table, and a pointer 51 that can move along the scrollbar 50 is displayed at the left edge thereof. The order for displaying the thumbnail row, scrollbar 50, and pointer 51 is not necessarily limited to the order given above.

Returning to FIG. 5, after displaying the thumbnail display screen in its initial state in S501, in S502 the CPU 21 determines if an N-in-1 condition has been set. Examples of N-in-1 conditions are 2-in-1, indicating that two images are to be printed on one sheet of recording paper, and 4-in-1, indicating that four images are to be printed on one sheet of recording paper.

If an N-in-1 condition has been set (S502: YES), in S503 the CPU 21 acquires the N-in-1 condition from the N-in-1 condition memory area 24c. If the N-in-1 condition has been set to 2-in-1, for example, selection numbers are displayed in the thumbnail display screen in a style that changes every two numbers. In such case, for example, selection numbers "1" and "2" may be displayed in a simple nondecorative font, selection numbers "3" and "4" may be displayed in an outline fine, and selection numbers "5" and "6" may be each displayed within a circle. However, if an N-in-1 condition has not been set (S502: NO), then the CPU 21 skips the process in S503 and advances to S504.

In S504 the CPU 21 determines whether the user has touched either the scrollbar 50 or a selection number. If neither the scrollbar 50 nor a selection number was touched (S504: NO), the CPU 21 advances to S507 described later. However, if either the scrollbar 50 or a selection number was touched (S504: YES), then in S505 the CPU 21 determines whether the clear selection flag 24d set previously by the use is "1". If the clear selection flag 24d has been set to "1" (S505: YES), the CPU 21 advances to S516 described below.

However, if the clear selection flag 24d is not "1" (S505: NO), in S506 the CPU 21 shifts the thumbnail row in order to display the thumbnail corresponding to the touched segment of the scrollbar 50 or the thumbnail corresponding to the touched selection number in the thumbnail row.

Here, the case in which the scrollbar 50 was touched will be described in detail with reference to FIGS. 6(a2) and 6(b2). FIG. 6(a2) shows the thumbnail display screen after scrolling the thumbnail row from the thumbnail display screen shown in FIG. 6(a1). FIG. 6(b2) shows the thumbnail list updated from the list shown in FIG. 6(b1) after the scrollbar 50 was touched.

In this example, the user has touched the fifth segment from the left in the scrollbar 50 while the thumbnail display screen was in its initial state shown in FIG. 6(a1).

At this time, the CPU 21 detects the coordinates on the LCD 41 touched by the user and determines which segment of the scrollbar 50 was touched by referencing the coordinate table with the detected coordinates. In this example, the CPU 21 detects that the fifth segment from the left in the scrollbar 50 was touched. Consequently, the CPU 21 treats this operation as an instruction for displaying the thumbnail having a page number 55 of "5" in the thumbnail list on the far left of the thumbnail row.

Accordingly, the CPU 21 updates the thumbnail list shown in FIG. 6(b1) to that shown in FIG. 6(b2). Specifically, the CPU 21 sets the in-screen flags 57 corresponding to page numbers 55 "5-8" to "1" and sets all other in-screen flags 57 to "0".

Next, the CPU 21 updates the thumbnail display screen from the state shown in FIG. 6(a1) to the state shown in FIG. 6(a2) based on the updated thumbnail list shown in FIG. 6(b2). That is, the CPU 21 displays the four thumbnails corresponding to page numbers 55 "5-8" (roman numerals V-VIII) in order from left to right in the thumbnail row.

Further, when the CPU 21 detects the touched coordinates in the scrollbar 50, the CPU 21 displays the pointer 51 at the detected coordinate position, as shown in FIG. 6(a2). In this way, the user can readily determine the general position in the overall thumbnail order to which the currently displayed thumbnails belong.

While the thumbnail corresponding to the touched position in the scrollbar 50 touched by the user is displayed in the leftmost region in the thumbnail row in the preferred embodiment described above, the thumbnail corresponding to the touched position may be displayed at any position in the thumbnail row and is not restricted to the leftmost position.

Further, when a selection number described later displayed in the thumbnail display screen was touched, the CPU 21 displays the thumbnail corresponding to the touched selection number in the leftmost position.

Returning to FIG. 5, after the CPU 21 shifts the thumbnail row in S506 or if the CPU 21 determines in S504 that neither the scrollbar 50 nor a selection number was touched, in S507 the CPU 21 determines whether a thumbnail was touched in the thumbnail row. If a thumbnail was not touched (S507: NO), the CPU 21 advances to S520 described later.

However, if a thumbnail was touched (S507: YES), in S508 the CPU 21 determines whether the selected flag 58 of the touched thumbnail is set to "1" in the thumbnail list. If the selected flag 58 is "1", i.e., in a selected state (S508: YES), indicating that the same thumbnail has been selected multiple times (two or more times), the CPU 21 skips the process of S509-S511 and advances to S513 described later.

However, if the selected flag 58 is set to "0", indicating that the touched thumbnail is in an unselected state (S508: NO), in S509 the CPU 21 changes the selected flag 58 for the touched thumbnail from "0" to "1". In other words, when the user touches a thumbnail displayed in the thumbnail row in the preferred embodiment, the touched thumbnail is set to a selected state.

In S510 the CPU 21 increments the counter 24e by 1 and in S511 sets the selection number 59 of the touched thumbnail to the value indicated by the incremented counter 24e.

In S513 the CPU 21 determines whether the clear selection flag 24d is set to "1". If the clear selection flag 24d is "1" (S513: YES), the CPU 21 advances to S516 described later. If the clear selection flag 24d is not set to "1" (S513: NO), in S514 the CPU 21 increments the selection count for the touched thumbnail.

In S515 the CPU 21 displays a frame W around the touched thumbnail (see FIG. 7) and displays the selection number set in S511 and a value indicating the selection count (excluding 1) set in S514 in the selection number display region N corresponding to the touched thumbnail (see FIG. 8(*a*2)).

In S520 the CPU 21 determines whether the user has completed editing. Specifically, a Finished Editing icon including the character string "Finished Editing" (not shown) is displayed in the thumbnail display screen, and the CPU 21 determines whether the user has touched this Finished Editing icon. If the user has not touched the Finished Editing icon within a prescribed time (S520: NO), then the CPU 21 repeats the process from S504. However, if the user has touched the Finished Editing icon (S520: YES), the CPU 21 ends the editing process.

Here, an example of displaying selection number "1" on the LCD 41 will be described with reference to FIGS. 7(*a*1) and 7(*b*1). FIG. 7(*a*1) shows the thumbnail display screen when the selection number "1" has been displayed. FIG. 7(*b*1) shows the thumbnail list based on which the thumbnail display screen of FIG. 7(*a*1) was displayed.

This example assumes that the user touched the thumbnail displayed in the second position from the left in the thumbnail row when the thumbnail display screen is in the initial state shown in FIG. 6(*a*1). At this time, the CPU 21 detects the coordinates of the LCD 41 touched by the user and determines the touched thumbnail by referencing the coordinate table with the detected coordinates.

In this example, the CPU 21 detects that the second display region from the left in the thumbnail row was touched using the coordinate table and determines that the touched thumbnail is the second thumbnail in the thumbnail list shown in FIG. 6(*b*1) having an in-screen flag 57 set to "1" in increasing order of the page numbers 55.

Accordingly, the CPU 21 adds "1" to the counter 24e, setting the counter 24e to "1". The CPU 21 also updates the thumbnail list shown in FIG. 6(*b*1) to that shown in FIG. 7(*b*1). Specifically, the CPU 21 changes the selected flag 58 for the thumbnail having a page number 55 of "2" from "0" to "1", changes the selection number 59 from "-" to "1" based on the value of the counter 24e, and changes the selection count 60 from "-" to "1".

Next, the CPU 21 updates the thumbnail display screen from the state shown in FIG. 6(*a*1) to the state shown in FIG. 7(*a*1) based on the updated thumbnail list in FIG. 7(*b*1). That is, the CPU 21 displays the frame W around the second thumbnail from the left in the thumbnail row and displays the number "1" indicated by the selection number 59 in the selection number display region N corresponding to the touched thumbnail. The CPU 21 also moves the pointer 51 to the segment of the scrollbar 50 corresponding to the touched thumbnail.

Next, an example in which the selection number "2" is displayed will be described with reference to FIGS. 7(*a*2) and 7(*b*2). FIG. 7(*a*2) shows the thumbnail display screen when the selection number "2" is displayed. FIG. 7(*b*2) shows the thumbnail list for displaying the thumbnail display screen shown in FIG. 7(*a*2).

This example assumes that the user has touched the fifth segment from the left in the scrollbar 50 when the thumbnail display screen is in the state shown in FIG. 7(*a*1). As described above, the CPU 21 sets the in-screen flags 57 to "1" for thumbnails having the page numbers 55 "5-8" in the thumbnail list shown in FIG. 7(*b*1) and sets all other in-screen flags 57 to "0". Next, the CPU 21 displays the four thumbnails having page numbers 55 "5-8" (roman numerals (V-VIII) in order from left to right in the thumbnail row, as shown in FIG. 7(*a*2).

The example further assumes that the user touches the thumbnail displayed in the fourth region from the left of the thumbnail row shown in FIG. 7(*a*2). At this time, the CPU 21 increments the counter 24e, setting the counter 24e to "2", and subsequently updates the thumbnail list shown in FIG. 7(*b*1) to that shown in FIG. 7(*b*2). More specifically, the CPU 21 changes the selected flag 58 for the thumbnail in the thumbnail list shown in FIG. 7(*b*1) having the page number 55 "8" from "0" to "1", changes the selection number 59 for the same thumbnail from "-" to "2" based on the value of the counter 24e, and changes the selection count 60 from "-" to "1".

Next, the CPU 21 updates the thumbnail display screen to the state shown in FIG. 7(*a*2) based on the updated thumbnail list shown in FIG. 7(*b*2). That is, the CPU 21 displays the frame W around the fourth thumbnail from the left in the thumbnail row and displays the numeral "2" indicated by the selection number 59 in the selection number display region N corresponding to the touched thumbnail.

Next, an example in which the selection number "3" is displayed will be described with reference to FIGS. 8(*a*1) and 8(*b*1). FIG. 8(*a*1) shows the thumbnail display screen when the selection number "3" is displayed. FIG. 8(*b*1) shows the thumbnail list for displaying the thumbnail display screen shown in FIG. 8(*a*1).

This example assumes that the user has touched the first segment from the left in the scrollbar 50 when the thumbnail display screen is in the state shown in FIG. 7(*a*2). As described above, the CPU 21 sets the in-screen flags 57 to "1" for thumbnails having the page numbers 55 "1-4" in the thumbnail list shown in FIG. 7(b2) and sets all other in-screen flags 57 to "0". Next, the CPU 21 displays the four thumbnails having page numbers 55 "1-4" (roman numerals (I-IV) in order from left to right in the thumbnail row, as shown in FIG. 8(a1).

The example further assumes that the user touched the thumbnail displayed in the fourth region from the left of the thumbnail row in the thumbnail display screen shown in FIG. 8(a1). At this time, the CPU 21 increments the counter 24e, setting the counter 24e to "3", and subsequently updates the thumbnail list shown in FIG. 7(b2) to that shown in FIG. 8(b1). More specifically, the CPU 21 changes the selected flag 58 for the thumbnail in the thumbnail list shown in FIG. 7(b2) having the page number 55 "4" from "0" to "1", changes the selection number 59 for the same thumbnail from "-" to "3" based on the value of the counter 24e, and changes the selection count 60 from "-" to "1".

Next, the CPU 21 updates the thumbnail display screen to the state shown in FIG. 8(a1) based on the updated thumbnail list shown in FIG. 8(b1). That is, the CPU 21 displays the frame W around the fourth thumbnail from the left in the thumbnail row and displays the numeral "3" indicated by the selection number 59 in the selection number display region N corresponding to the touched thumbnail.

Next, an example in which the same thumbnail is selected twice will be described with reference to FIGS. 8(a2) and 8(b2). FIG. 8(a2) shows the thumbnail display screen when the selection count "(2)" is displayed next to the selection number "3". FIG. 8(b2) shows the thumbnail list for displaying the thumbnail display screen of FIG. 8(a2).

This example assumes that the user touches a thumbnail displayed fourth from the left in the thumbnail row when the thumbnail display screen is in the state shown in FIG. 8(a1). In this case, the CPU 21 increments the counter 24e by 1 to "4" and changes the selection count 60 for the thumbnail in the thumbnail list shown in FIG. 8(b1) having the page number 55 "4" from "1" to "2". Subsequently, the CPU 21 changes the thumbnail display screen to the state shown in FIG. 8(a2) based on the updated thumbnail list shown in FIG. 8(b2). That is, the CPU 21 displays a "(2)" indicating the selection count next to the selection number "3". Through this display, the user can quickly determine that the thumbnail having selection number "3" has been selected twice. The position in which the selection count "(2)" is displayed is not limited to the above example, but may be above or below the selection number in the corresponding selection number display region N, for example.

Hence, through the editing process described above, the multifunction device 1 displays the order in which the user selected the thumbnails from the thumbnails displayed in the thumbnail row as a selection number in the corresponding position of the scrollbar 50. If the user touches the selection number of the scrollbar 50 at a position corresponding to the selection number, the multifunction device 1 displays the thumbnail corresponding to this selection number in the thumbnail row. Therefore, the user can display a desired thumbnail from among user-selected thumbnails through a simple operation of touching the selection number of the scrollbar 50 at a position corresponding to this selection number.

Returning to FIG. 5, if the clear selection flag 24d is set to "1" in S505 or S513, the CPU 21 advances to S516. In S516 the CPU 21 sets the selected flag 58 for the thumbnail in question (the touched thumbnail, the thumbnail corresponding to the touched segment of the scrollbar 50, or the thumbnail corresponding to the touched selection number) is set to "0", or unselected. In S517 the CPU 21 decrements the counter 24e by 1 and in S518 updates the selection number 59 for the thumbnail in the thumbnail list. In S519 the CPU 21 updates the selection number displayed in the corresponding selection number display region N based on the updated selection number 59. In S520 the CPU 21 determines whether the user has completed editing, as described above.

Here, an example in which the clear selection flag 24d has been set to "1" will be described with reference to FIG. 9. This example assumes that the clear selection flag 24d is currently set to "1" and that the thumbnail display screen shown in FIG. 9(a1) has been displayed based on the thumbnail list shown in FIG. 9(b1).

From this state, it will be assumed that the user has either touched the fourth thumbnail from the left in the thumbnail row, the segment of the scrollbar 50 corresponding to the eighth number from the left, or the selection number "2" in the thumbnail display screen of FIG. 9(a1). At this time, the CPU 21 identifies the touched thumbnail, or the thumbnail corresponding to the touched segment or the touched selection number. In this example, the CPU 21 identifies the selected thumbnail as that corresponding to page number "8".

Next, the CPU 21 updates the thumbnail list of FIG. 9(b1) to that shown in FIG. 9(b2). Specifically, the CPU 21 changes the selected flag 58 for the thumbnail having page number "8" in the thumbnail list shown in FIG. 9(b1) from "1" to "0", i.e., sets the thumbnail to an unselected state. Further, the CPU 21 decrements the counter 24e by 1 and decrements all selection numbers 59 in the thumbnail list greater than "2" by 1.

Subsequently, the CPU 21 sets the thumbnail display screen to that shown in FIG. 9(a2) based on the updated thumbnail list shown in FIG. 9(b2) so that the selection number "2" shown in FIG. 9(a1) is deleted and the selection number "3" is changed to "2".

Returning again to the flowchart in FIG. 4, after completing the editing process in S407, the CPU 21 determines in S408 whether the user has inputted an instruction to execute a prescribed process. If the user has inputted an instruction for a printing process (S408: print), in S409 the CPU 21 executes a printing process to print image data according to the currently set order, and subsequently ends the image data reordering process. If the user has inputted an instruction for a facsimile transmission process (S408: fax), in S410 the CPU 21 executes the facsimile transmission process to transmit via fax image data according to the currently set order, and subsequently ends the image data reordering process. If the user has inputted an instruction for a file creating process (S408: file), in S411 the CPU 21 executes the file creating process to create and save all image data according to the currently set order as a single file, and subsequently ends the image data reordering process. If the user has inputted an instruction for a slideshow display process (S408: slideshow), in S412 the CPU 21 executes the slideshow display process to display image data according to the currently set order, and subsequently ends the image data reordering process. Through this process, the multifunction device 1 can print, transmit via fax, save, and display image data in the order desired by the user.

Although the present invention has been described with respect to specific embodiments, it will be appreciated by one skilled in the art that a variety of changes may be made without departing from the scope of the invention.

For example, in the preferred embodiment described above, the selection number is displayed at a corresponding position of the scrollbar 50, but the selection number may be displayed at a position unrelated to the scrollbar 50. Naturally, when the user touches this selection number, the thumbnail corresponding to the selection number is displayed in the thumbnail row as in the preferred embodiment.

Further, the multifunction device 1 of the preferred embodiment described above is provided with the clear selection flag 24*d* and determines whether to clear the selected state of a thumbnail based on the set state of the clear selection flag 24*d*. However, the multifunction device 1 need not be provided with the clear selection flag 24*d* but may be configured to clear the selected state of a thumbnail when the thumbnail is touched twice consecutively, for example.

In the preferred embodiment described above, the selection count is displayed in association with the selection number (next to the selection number) for a thumbnail that has been selected a plurality of (two or more) times, but it is also possible to display the selection number a plurality of times. For example, if the same thumbnail is selected three times in the selection order first, third, and fifth, the multifunction device 1 may display the numbers "1", "3", and "5" directly instead of the selection count, thereby enabling the user to quickly learn both the display order and the selection count.

Further, when the scrollbar 50 is displayed in the preferred embodiment described above, numbers indicating the display order may be displayed in the segments of the scrollbar 50, providing the user with a guideline to determine which segment of the scrollbar 50 to touch.

Further, while a touch panel is used in the preferred embodiment to identify a display region on the LCD 41 touched by the user, the present invention is not limited to a touch panel method in which the user directly touches the LCD 41, but may employ a touch panel capable of detecting coordinates on the LCD 41 based on physical proximity to the LCD 41 or the like.

What is claimed is:

1. An image-displaying device comprising:
 a storing unit configured to store correlation data between a plurality of thumbnails and a sequence of the plurality of thumbnails such that each of the plurality of thumbnails is assigned with a page number;
 a display including a first portion and a second portion;
 a display control unit configured to control the display to display, on the first portion of the display, a series of thumbnails from among the plurality of thumbnails at a time based on the correlation data such that the series of thumbnails is displayed in order determined by the page number, and to display, on the second portion of the display simultaneously with the series of thumbnails on the first portion of the display, a plurality of identification images; and
 a selection receiving unit configured to receive a selection of a thumbnail from among the series of thumbnails displayed on the first portion of the display unit,
 wherein, when the image-displaying device is in a mode, each time a thumbnail is selected from among the series of thumbnails displayed on the first portion of the display, the display control unit controls the display such that an identification image identifying the selected thumbnail is additionally displayed on the second portion of the display and linked to the selected thumbnail,
 wherein the selection receiving unit is configured to receive a selection of an identification image from among the plurality identification images displayed on the second portion of the display,
 wherein, if a first identification image of the plurality identification images displayed on the second portion of the display is selected, the display control unit controls the display to display, on the first portion of the display, a series of first thumbnails including a first target thumbnail which has been linked to the selected first identification image when the first target thumbnail was selected and the first identification image was additionally displayed on the display,
 wherein, if a second identification image of the plurality identification images displayed on the second portion of the display is selected, the display control unit controls the display to display, on the first portion of the display, a series of second thumbnails including a second target thumbnail which has been linked to the selected second identification image when the second target thumbnail was selected and the second identification image was additionally displayed on the display,
 wherein the display control unit is configured to control the display to display a bar on the second portion of the display, the page number corresponding to a position with respect to a direction in which the bar extends, and
 wherein the plurality of identification images is arrayed along the bar on the second portion of the display such that each of the plurality of identification images is displayed at a position corresponding to a page number that is assigned to a thumbnail identified by the each of the plurality of identification images.

2. The image-displaying device according to claim 1, further comprising a counting unit configured to count a selected order each time one of the series of thumbnails displayed on the first portion of the display is selected,
 wherein the display control unit controls the display to display, on the first portion of the display, the selected thumbnail together with the selected order in which the selected thumbnail is selected.

3. The image-displaying device according to claim 1, wherein if a thumbnail is selected a plurality of times, the display control unit controls the display to display, on the first portion of the display, the identification image of the selected thumbnail together with the number of times the thumbnail is selected.

4. The image-displaying device according to claim 1, further comprising a group setting unit configured to set groups to which a prescribed number of selected thumbnails belong,
 wherein the display control unit controls the display to display, on the first portion of the display, the thumbnails in a different display format for every group.

5. The image-displaying device according to claim 1, wherein the display control unit controls the display to further display, based on the correlation data, a plurality of icons corresponding to the plurality of thumbnails respectively,
 wherein if an icon is selected, the display control unit controls the display to display the series of thumbnails including a thumbnail corresponding to the selected icon.

6. The image-displaying device according to claim 1, wherein the display includes a plurality of first display regions corresponding to the plurality of thumbnails respectively,
 wherein if one of the plurality of first regions is touched by a user, the display control unit controls the display to display, on the first portion of the display, the series of thumbnails including a thumbnail corresponding to the touched first region.

7. The image-displaying device according to claim 1, wherein the display includes, in the second portion thereof, a plurality of second display regions corresponding to the plurality of pieces of identification image respectively,
 wherein if one of the plurality of second regions is touched by a user, the display control unit controls the display to display, on the first portion of the display, the series of thumbnails including a thumbnail corresponding to an identification image corresponding to the touched second region.

8. The image-displaying device according to claim 1, wherein the display control unit controls the display to sequentially display the selected thumbnails in a selected order.

9. The image-displaying device according to claim 1, further comprising a file creating unit configured to create a single file including images corresponding to the selected thumbnails.

10. The image-displaying device according to claim 1, further comprising a printing unit configured to print images corresponding to the selected thumbnails.

11. The image-displaying device according to claim 1, further comprising a facsimile transmitting unit configured to transmit images corresponding to the selected thumbnails as a facsimile.

12. The image-displaying device according to claim 1, wherein the bar comprises a scrollbar.

* * * * *